(12) United States Patent
Otto et al.

(10) Patent No.: US 10,215,053 B2
(45) Date of Patent: Feb. 26, 2019

(54) FAN DRIVE GEAR SYSTEM MANIFOLD RADIAL TUBE FILTERS

(71) Applicant: United Technologies Corporation, Hartford, CT (US)

(72) Inventors: John R. Otto, Middletown, CT (US); Stephanie M. Baker, East Hampton, CT (US)

(73) Assignee: United Technologies Corporation, Farmington, CT (US)

( * ) Notice: Subject to any disclaimer, the term of this patent is extended or adjusted under 35 U.S.C. 154(b) by 449 days.

(21) Appl. No.: 14/414,550

(22) PCT Filed: Jul. 3, 2014

(86) PCT No.: PCT/US2014/045346
§ 371 (c)(1),
(2) Date: Jan. 13, 2015

(87) PCT Pub. No.: WO2015/047515
PCT Pub. Date: Apr. 2, 2015

(65) Prior Publication Data
US 2016/0273385 A1 Sep. 22, 2016

Related U.S. Application Data

(60) Provisional application No. 61/843,422, filed on Jul. 7, 2013.

(51) Int. Cl.
*F01D 25/18* (2006.01)
*F01D 9/06* (2006.01)
(Continued)

(52) U.S. Cl.
CPC .............. *F01D 25/18* (2013.01); *B01D 29/11* (2013.01); *B01D 29/52* (2013.01); *B01D 35/005* (2013.01);
(Continued)

(58) Field of Classification Search
CPC .......... F01D 25/18; F01D 9/065; F01D 15/12; B01D 29/11; B01D 29/52; B01D 35/005; F02C 7/06; F16H 57/0404
See application file for complete search history.

(56) References Cited

U.S. PATENT DOCUMENTS 3,287,906 A 11/1966 McCormick
3,722,212 A 3/1973 Stein
(Continued)

FOREIGN PATENT DOCUMENTS

EP 2166196 A2 3/2010
FR 2925110 A1 6/2009
(Continued)

OTHER PUBLICATIONS

International Preliminary Report on Patentability for PCT Application No. PCT/US2014/045346 dated Jan. 21, 2016.
(Continued)

*Primary Examiner* — Michael A Riegelman
(74) *Attorney, Agent, or Firm* — Carlson, Gaskey & Olds, P.C.

(57) ABSTRACT

A lubrication system for gas turbine engine includes a main lubricant passage for providing lubricant from a lubricant supply to a lubricant manifold. The lubricant manifold includes first and second lubricant passages The lubricant manifold is configured to supply lubricant to first and second separate parts of a geared architecture at different first and second lubricant flow conditions. A first filter element is provided within a radial tube for supplying lubricant to the first passage of the lubricant manifold and a second filter element is provided within a second radial tube for supplying lubricant to the second lubricant passage of the lubricant manifold. The first filter element is different than the second filter element.

15 Claims, 4 Drawing Sheets

(51) Int. Cl.

| | | |
|---|---|---|
| *F02C 7/06* | (2006.01) | |
| *F16H 57/04* | (2010.01) | |
| *B01D 29/11* | (2006.01) | |
| *B01D 29/52* | (2006.01) | |
| *B01D 35/00* | (2006.01) | |
| *F01D 15/12* | (2006.01) | |
| *F16N 7/40* | (2006.01) | |
| *F01M 1/12* | (2006.01) | |

(52) U.S. Cl.
CPC ............. *F01D 9/065* (2013.01); *F01D 15/12* (2013.01); *F02C 7/06* (2013.01); *F16H 57/0404* (2013.01); *F01M 2001/126* (2013.01); *F05D 2220/32* (2013.01); *F05D 2260/40311* (2013.01); *F05D 2260/98* (2013.01); *F16N 7/40* (2013.01)

(56) References Cited

U.S. PATENT DOCUMENTS

| | | |
|---|---|---|
| 3,754,484 A | 8/1973 | Roberts |
| 3,837,430 A * | 9/1974 | Decker ............... F16N 7/40 184/109 |
| 3,892,358 A | 7/1975 | Gisslen |
| 4,130,872 A | 12/1978 | Harloff |
| 4,601,820 A | 7/1986 | Leason |
| 5,121,599 A | 6/1992 | Snyder et al. |
| 5,433,674 A | 7/1995 | Sheridan et al. |
| 5,447,411 A | 9/1995 | Curley et al. |
| 5,524,847 A | 6/1996 | Brodell et al. |
| 5,778,659 A | 7/1998 | Duesler et al. |
| 5,857,836 A | 1/1999 | Stickler et al. |
| 5,915,917 A | 6/1999 | Eveker et al. |
| 5,975,841 A | 11/1999 | Lindemuth et al. |
| 6,223,616 B1 | 5/2001 | Sheridan |
| 6,318,070 B1 | 11/2001 | Rey et al. |
| 6,814,541 B2 | 11/2004 | Evans et al. |
| 7,021,042 B2 | 4/2006 | Law |
| 7,040,874 B1 | 5/2006 | Martin et al. |
| 7,591,754 B2 | 9/2009 | Duong et al. |
| 7,824,305 B2 | 11/2010 | Duong et al. |
| 7,926,260 B2 | 4/2011 | Sheridan et al. |
| 8,205,432 B2 | 6/2012 | Sheridan |
| 8,226,822 B2 | 7/2012 | Paradise |
| 8,282,825 B2 | 10/2012 | Kent |
| 2003/0230274 A1 | 12/2003 | Williams et al. |
| 2004/0035776 A1 | 2/2004 | Coleman |
| 2005/0034925 A1* | 2/2005 | Flamang ............. F16H 57/0402 184/6.12 |
| 2007/0137935 A1 | 6/2007 | Craig |
| 2008/0073261 A1 | 3/2008 | Schwab et al. |
| 2010/0148396 A1 | 6/2010 | Xie et al. |
| 2010/0324899 A1 | 12/2010 | Yamabana |
| 2010/0331139 A1 | 12/2010 | McCune |
| 2012/0088624 A1 | 4/2012 | Sheridan |
| 2012/0118051 A1 | 5/2012 | Raadnui |
| 2012/0272762 A1 | 11/2012 | Sheridan |
| 2012/0277055 A1 | 11/2012 | Sheridan |
| 2013/0051984 A1 | 2/2013 | McCune et al. |
| 2013/0074630 A1* | 3/2013 | Jarvinen ............. F16H 57/0413 74/467 |
| 2014/0026534 A1 | 1/2014 | Homeyer |

FOREIGN PATENT DOCUMENTS

| | | |
|---|---|---|
| GB | 1516041 | 6/1978 |
| GB | 2041090 | 9/1980 |
| JP | S6138126 A | 2/1986 |
| JP | S6278420 A | 4/1987 |
| JP | 2002227659 | 8/2002 |
| WO | 2007038674 | 4/2007 |

OTHER PUBLICATIONS

Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida.

Agarwal, B.D and Broutman, L.J. (1990). Analysis and performance of fiber composites, 2nd Edition. John Wiley & Sons, Inc. New York: New York.

Carney, K., Pereira, M. Revilock, and Matheny, P. Jet engine fan blade containment using two alternate geometries. 4th European LS-DYNA Users Conference.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C: Taylor & Francis.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.nmsonline.com/articles/composite-fan-blade-containment-case.

Hall, C.A. and Crichton, D. (2007). Engine design studies for a silent aircraft. Journal of Turbomachinery, 129, 479-487.

Hague, A. and Shamsuzzoha, M., Hussain, F., and Dean, D. (2003). S20-glass/epoxy polymer nanocomposies: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979.

Horikoshi, S. and Serpone, N. (2013). Introduction to nanoparticles. Microwaves in nanoparticle synthesis. Wiley-VCH Verlag GmbH & Co. KGaA.

Kerrebrock, J.L. (1977). Aircraft engines and gas turbines. Cambridge, MA: The MIT Press.

Xie, M. (2008). Intelligent engine systems: Smart case system. NASA/CR-2008-215233.

Knip, Jr., G. (1987). Analysis of an advanced technology subsonic turbofan incorporating revolutionary materials. NASA Technical Memorandum. May 1987.

Willis, W.S. (1979). Quiet clean short-haul experimental engine (QCSEE) final report. NASA/CR-159473.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press.

Ramsden, J.M. (Ed). (1978). The new European airliner. Flight International, 113(3590). Jan. 7, 1978.

Langston, L. and Faghri, A. Heat pipe turbine vane cooling. Prepared for Advanced Turbine Systems Annual Program Review. Morgantown, West Virginia. Oct. 17-19, 1995.

Oates, G.C. (Ed). (1989). Aircraft propulsion systems and technology and design. Washington, D.C.: American Institute of Aeronautics, Inc.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

(56) References Cited

OTHER PUBLICATIONS

Lynwander, P. (1983). Gear drive systems: Design and application. New York, New York: Marcel Dekker, Inc.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc.

Pyrograf-III Carbon Nanofiber. Product guide. Retrieved from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc.

Ratna, D. (2009). Handbook of thermoset resins. Shawbury, UK: iSmithers.

Wendus, B.E., Stark, D.F., Holler, R.P., and Funkhouser, M.E. (2003). Follow-on technology requirement study for advanced subsonic transport. NASA/CR-2003-212467.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983.

Dickey, T.A. and Dobak, E.R. (1972). The evolution and development status of ALF 502 turbofan engine. National Aerospace Engineering and Manufacturing Meeting. San Diego, California. Oct. 2-5, 1972.

Gunston, B. (Ed.) (2000). Jane's aero-engines, Issue seven. Coulsdon, Surrey, UK: Jane's Information Group Limited.

Ivchenko-Progress D-436. Jane's Aero-engines, Aero-engines—Turbofan. Feb. 8, 2012.

Ivchenko-Progress AI-727M. Jane's Aero-engines, Aero-engines—Turbofan. Nov. 27, 2011.

Ivchenko-Progress D-727. Jane's Aero-engines, Aero-engines—Turbofan. Feb. 7, 2007.

Turbomeca Aubisque. Jane's Aero-engines, Aero-engines—Turbofan. Nov. 2, 2009.

Aviadvigatel D-110. Jane's Aero-engines, Aero-engines—Turbofan. Jun. 1, 2010.

Rolls-Royce M45H. Jane's Aero-engines, Aero-engines—Turbofan. Feb. 24, 2010.

Honeywell LF502. Jane's Aero-engines, Aero-engines—Turbofan. Feb. 9, 2012.

Honeywell LF507. Jane's Aero-engines, Aero-engines—Turbofan. Feb. 9, 2012.

Honeywell TFE731. Jane's Aero-engines, Aero-engines—Turbofan. Jul. 18, 2012.

NASA Conference Publication. Quiet, powered-lift propulsion. Cleveland, Ohio. Nov. 14-15, 1978.

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8), p. 32.

Hendricks, E.S. and Tong, M.T. (2012). Performance and weight estimates for an advanced open rotor engine. NASA/TM-2012-217710.

Guynn, M. D., Berton, J.J., Fisher, K. L, Haller, W.J., Tong, M. T., and Thurman, D.R. (2011). Refined exploration of turbofan design options for an advanced single-aisle transport. NASA/TM-2011-216883.

Zalud, T. (1998). Gears put a new spin on turbofan performance. Machine Design, 70(20), p. 104.

International Search Report and Written Opinion for PCT Application No. PCT/US2014/045346, dated Apr. 17, 2015.

European Search Report for EP Application No. 14847155.0 dated Nov. 29, 2016.

Supplementary Partial European Search Report for EP Application No. 14847155.0 dated Aug. 3, 2016.

* cited by examiner

FAN DRIVE GEAR SYSTEM MANIFOLD RADIAL TUBE FILTERS

REFERENCE TO RELATED APPLICATION

This application is a United States National Phase application of PCT/US2014/045346 filed on Jul. 3, 2014, which claims priority to United States Provisional Application No. 61/843,422 filed on Jul. 7, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A speed reduction device such as an epicyclical gear assembly may be utilized to drive the fan section such that the fan section may rotate at a speed different than the turbine section so as to increase the overall propulsive efficiency of the engine. In such engine architectures, a lubricant routed through passages in a manifold to specific portions of the gear assembly.

The gear assembly may require lubricant in different temperatures and pressures to meet lubricant and cooling requirements. Moreover, the location of the geared architecture may provide a convenient means of directing lubricant to parts of the engine located near the gear assembly. Accordingly, the lubricant manifold includes separate passages for directing lubricant to different parts of the gear assembly and engine. A main filter is provided for the entire system and screens are placed within channels of the manifold to prevent contaminants from reaching portions of the gear assembly. The main filter is not suitable to control contaminants that may originate within the system that could interfere with gear operation.

Although geared architectures have improved propulsive efficiency, turbine engine manufacturers continue to seek further improvements to engine performance including improvements to thermal, transfer and propulsive efficiencies.

SUMMARY

A fan drive gear system according to an exemplary embodiment of this disclosure, among other possible things includes a geared architecture including gears supported by bearing structures for providing a speed change between an input and output, a lubricant manifold defining a first lubricant passage and a second lubricant passage, a first filtering characteristic for filtering lubricant flow to the first lubricant passage, and a second filtering characteristic for filtering lubricant flow to the second lubricant passage, wherein the second filtering characteristic is different than the first filtering characteristic.

In a further embodiment of the foregoing fan drive gear system, the first filtering characteristic includes a first filter element having a first porosity and the second filtering characteristic includes a second filter element having a second porosity different than the first porosity.

In a further embodiment of any of the foregoing fan drive gear systems, the first filter and the second filter include mesh screens.

In a further embodiment of any of the foregoing fan drive gear systems, mesh screens include metal mesh screens with a plurality of openings.

In a further embodiment of any of the foregoing fan drive gear systems, the first filter provides a first resistance to lubricant flow and the second filter provides a second resistance to lubricant flow that is less than the first resistance.

In a further embodiment of any of the foregoing fan drive gear systems, includes a first screen disposed within the first lubricant passage of the lubricant manifold downstream of the first filter and a second screen disposed within the second lubricant passage downstream of the second filter.

In a further embodiment of any of the foregoing fan drive gear systems, includes a first supply tube for supplying lubricant to the first lubricant passage and a second supply tube for supplying lubricant to the second lubricant passage. The first filter is disposed within the first supply tube and the second filter is disposed within the second supply tube.

In a further embodiment of any of the foregoing fan drive gear systems, at least one of the first and second filter elements is proximate a supply output end of the respective one of the first supply tube and the second supply tube.

In a further embodiment of any of the foregoing fan drive gear systems, the at least one of the first and second filter elements is removably positioned with the respective one of the first supply tube and the second supply tube. At least one of the first and second supply tubes is detachably connected to the geared architecture at the supply output and detaching the respective one of the first and second supply tube provides for removing and replacing the at least one of the first and second filter elements.

A lubrication system for gas turbine engine according to an exemplary embodiment of this disclosure, among other possible things includes a main lubricant passage including a main filter. A lubricant manifold is configured to receive lubricant from the main lubricant passage. The lubricant manifold defines a first lubricant passage and a second lubricant passage. A first filter element filters lubricant flow to the first lubricant passage. A second filter element filters lubricant flow to the second lubricant passage. The second filter is different than the first filter element.

In a further embodiment of the foregoing lubrication system, the first filter element is configured to provide lubricant flow at a first condition and the second filter element is configured to provide lubricant flow at a second condition different than the first condition.

In a further embodiment of any of the foregoing lubrication systems, the first condition includes a first temperature range and the second condition includes a second temperature range different than the first temperature range and the first filter is operable within the first temperature range and the second filter is operable within the second temperature range.

In a further embodiment of any of the foregoing lubrication systems, the first filter includes a first porosity and the second filter includes a second porosity different than the first porosity.

In a further embodiment of any of the foregoing lubrication systems, the first filter provides a first resistance to lubricant flow and the second filter provides a second resistance to lubricant flow that is less than the first resistance.

In a further embodiment of any of the foregoing lubrication systems, includes a first screen disposed within the first lubricant passage of the lubricant manifold downstream of the first filter and a second screen disposed within the second lubricant passage downstream of the second filter.

In a further embodiment of any of the foregoing lubrication systems, includes a first supply tube for supplying lubricant to the first lubricant passage and a second supply tube for supplying lubricant to the second lubricant passage. The first filter is disposed within the first supply tube and the second filter is disposed within the second supply tube.

A method of maintaining a fan drive gear system of a turbine engine according to an exemplary embodiment of this disclosure, among other possible things includes accessing a connection between a first supply tube and a lubricant manifold for supplying lubricant to a gear assembly of a fan drive gear system, removing a first filter mounted within the first supply tube, and visually checking the first filter for contaminants.

In a further embodiment of the foregoing method, includes accessing a connection between a second supply tube and the lubricant manifold, removing a second filter and visually checking the second filter for contaminants.

In a further embodiment of any of the foregoing methods, removing the first filter includes disconnecting the first supply tube from the lubricant manifold and removing the second filter comprises disconnecting the second supply tube from the lubricant manifold.

In a further embodiment of any of the foregoing methods, includes replacing the first filter with a filter including a flow characteristic different than a flow characteristic of the first filter.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
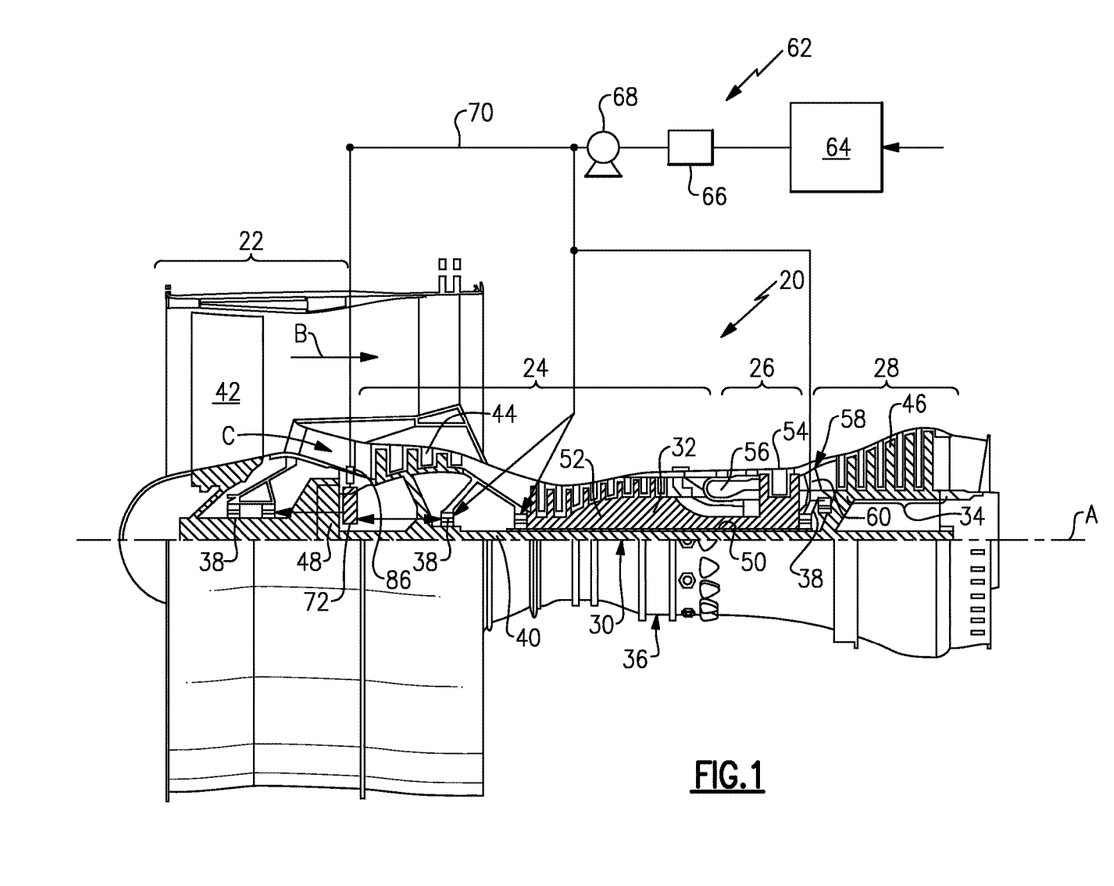
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by airflow through the bypass flow path B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
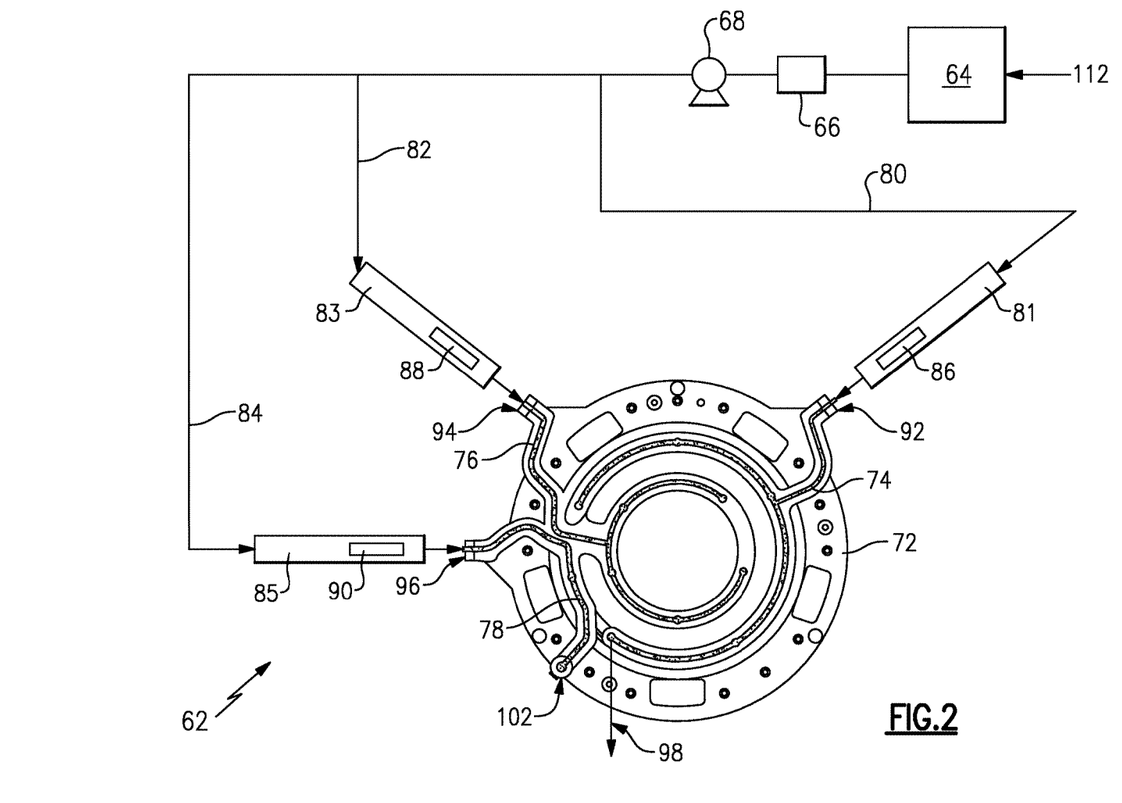
FIG. 2 is a schematic view of an example lubrication system for a gas turbine engine.

Referring to FIG. 2 with continued reference to FIG. 1, the example turbine engine 20 includes a lubrication system 62 that provides lubricant flow at desired temperatures and pressures to various elements throughout the engine 20. The lubrication system includes a pump 68, a main supply 64 and a main filter 66. A return circuit 112 returns lubricant to the supply 64. Lubricant is pumped through a main lubricant circuit 70 to different passages that supply lubricant to various bearing assemblies 38 located throughout the engine 20 and to a lubricant manifold 72 mounted proximate the geared architecture 48.

The lubricant manifold 72 provides lubricant to the geared architecture 48 and also to elements proximate to the lubricant manifold 72. A first filter element 86 is disposed within a tube extending radially from the lubricant to the manifold 72. The first filter 86 is in addition to the main filter 66 provided in the main lubricant circuit 70.

The example lubricant system 62 supplies lubricant to the manifold 72. The manifold 72 includes a first lubricant passage 74, a second lubricant passage 76 and a third lubricant passage 78. Each of the first, second and third lubricant passages 74, 76 and 78 are separate from the other such that the lubricant manifold 72 provides for different lubricant flows, temperatures, and other conditions of lubricant to be transmitted through the manifold 72 to various elements requiring lubrication and cooling.

The first passage 74 defined within the lubricant manifold 72 receives lubricant through a first lubricant circuit 80. A second lubricant circuit 82 supplies the second passage 76 and a third lubricant circuit 84 supplies the third passage 78.

The first lubricant circuit 80 includes a radially extending tube 81 that is connected to an inlet 92 of the manifold 72. Disposed within tube 81 is the first filter element 86.

The second circuit 82 includes a second radial tube 83 that is connected to a second inlet 94 and includes a second filter element 88. The second filter element 88 is different than the first filter element 86.

The third circuit 84 includes a third radial tube 85 that is connected to a third inlet 96 and includes a third filter element 90.

The first passage 74 supplies lubricant to an outlet 100 that, in turn, supplies oil to journal bearings 126 (FIG. 4) of the geared architecture 48. As appreciated, although journal bearings are described by way of example in this disclosure other bearing arrangements such as for example roller, cylindrical and the like requiring lubricant are within the contemplation of this disclosure.

The second passage 76 provides lubricant to gears 120, 122, 124 (FIG. 4) within the geared architecture 48 along with a torque frame 130 (FIG. 4) and other elements of the geared architecture 48 that require lubrication.

The third passage 78 provides a conduit through the lubricant manifold 72 to an outlet 102 to supply lubricant to other features that are proximate the geared architecture 48 and the lubricant manifold 72. For example, other features that may receive lubricant directed through the lubricant manifold 72 can include bearing assemblies 38 proximate the geared architecture 48 to support rotation of the fan 42 or that are present in a forward portion to support rotation of the inner shaft 40. Accordingly, the third passage 78 does not provide lubricant directly to the geared architecture 48, but provides lubricant to other components that are proximate the geared architecture 48.

It should be appreciated that each of the elements that are supplied lubricant through corresponding first, second and third passages 74, 76, and 78 require lubricant to be supplied in different conditions. Such conditions include for example, different flow rates, temperatures, and pressures. Because each of the lubricant's circuits 80, 82 and 84 provide lubricant at different flows and temperatures, the filtering requirements at each of the connection points are different. Each of the first, second and third filters 86,88, and 90 provide a different filtering or flow characteristic such as for example a desired resistance to flow and desired porosity to filter out contaminants of varying sizes, depending on the structure that is receiving that lubricant. For example, the journal bearings 126 may require a first porosity determined to provide lubricant at a first fluid flow rate to meet desired operational capacities. Moreover, the porosity may also be provided to prevent contaminants of a predetermined size.

The second filter element 88 supplying lubrication to the gears may require lubricant flow at a second rate that is different than the journal bearings 126. Accordingly, the second filter element 88 will include a second porosity and size that is different than the first porosity and size of the first filter element 86.

The third filter element 90 would also be of a different porosity and size to provide the desired lubricant flows from the outlet 102.

Figure 3A:
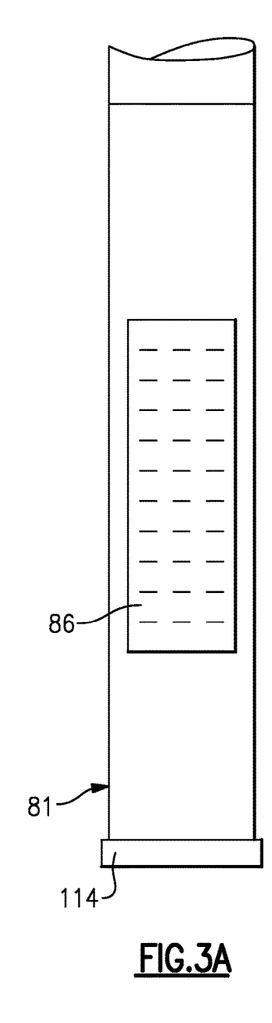
FIG. 3A is a schematic view of an example first filter element.
Figure 3B:
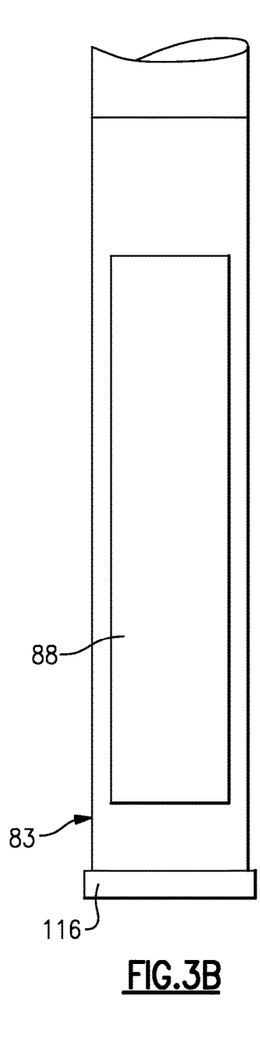
FIG. 3B is a schematic view of an example second filter element.
Figure 3C:
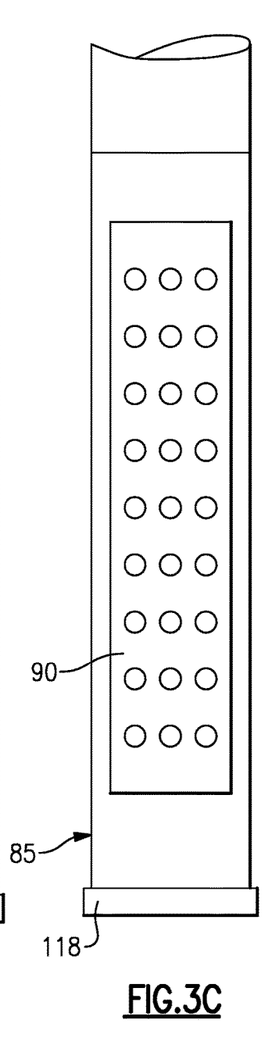
FIG. 3C is a schematic view of an example third filter element.

Referring to FIGS. 3A, 3B and 3C with continued reference to FIG. 2, the example filter elements 86, 88, and 90 are illustrated schematically. In this example, the first filter element 86 (FIG. 3A) includes a first porosity and is of a first size to provide a first resistance to flow. The second filter element 88 (FIG. 3B) is of a second porosity and a second size different than the first porosity and size. In this example, the second filter element 88 is larger than the first filter element 86 and includes a lower porosity and greater resistance to lubricant flow than the first filter element 86.

The third filter element 90 includes larger openings and, thereby, a greater porosity than either of the first and second filter elements 86, 88. Accordingly, the third filter element 90 is larger in size than the first and second filter elements 86, 88 and includes an increased porosity as compared to the first and second filter elements 86, 88.

The filter elements 86, 88 and 90 are disposed within each of the radial tubes 81, 83 and 85 proximate corresponding inlets 92, 94 and 96 of the lubricant manifold 72. Each of the radial tubes 81, 83 and 85 include a corresponding connection 114, 116 and 118 that attach to the corresponding inlets 92, 94 and 96 of the manifold 72.

The first, second and third filter elements 86, 88 and 90 can be formed of metal mesh material including a desired number and size of openings to provide the desired porosity. Moreover, the first, second and third filter elements 86, 88 and 90 may be formed of porous synthetic material or any material that provides the desired porosity while being compatible with the pressures and temperatures encountered within the lubricant system 62.

Figure 4:
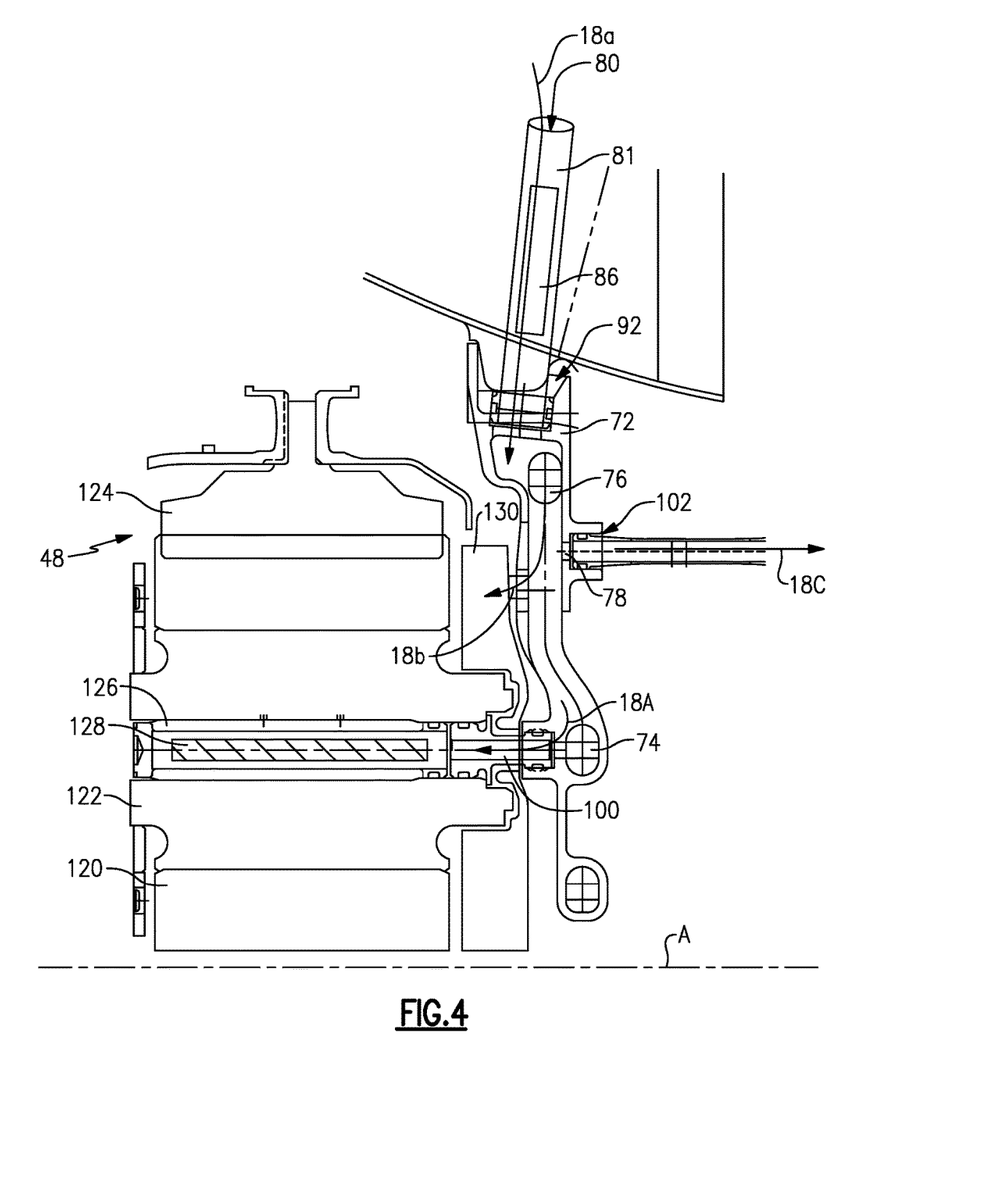
FIG. 4 is a cross-sectional view of an example lubrication manifold supplying lubricant to various parts of a geared architecture.

Referring to FIG. 4 with continued reference to FIG. 2 the example lubricant manifold 72 is shown in cross-sectioning with the first radial tube 81 shown inserted into the first inlet 92. Lubricant flow 18A communicated through the through the first circuit 80 passes through the first filter element 86 and into the first passage 74 of the lubricant manifold 72. The first lubricant passage 74 communicates the first lubricant flow 18A to the journal bearing 126. The example journal bearing 126 includes an inner cavity in which is provided a screen 128 to capture contaminants that may be communicated through the lubricant manifold 72.

In this example, the geared architecture 48 includes a sun gear 120 that drives planet gears 122 (only one shown here) that, in turn, drives a ring gear 124. In this example, there are a plurality of planet gears 122 that are supported on corresponding one journal bearings 126. The journal bearings 126 held within a carrier/torque frame assembly 130 to prevent rotation about the axis A. The journal bearing 126 is supplied with the first lubricant flow through the first lubricant passage 74 to provide lubrication to facilitate operation of the geared architecture 48.

The second passage 76 through the manifold 72 supplies a second lubricant flow 18B to the carrier/torque frame assembly 130 and also to other portions of the geared architecture, such as spray bars and other devices that communicate lubricant to elements within the geared architecture 48 other than the journal bearings 126.

The third passage 78 communicates a third lubricant flow 18c out of the lubricant manifold 72 through outlet 105 to bearing assemblies and other structures that are proximate the geared architecture 48 and lubricant manifold 72.

The use of the individual filter elements 86, 88 and 90 external to the lubricant manifold 72 within the radial tubes 81, 83 and 85 provides a secondary means of preventing contaminants from entering the geared architecture 48. Moreover, because each of the first, second and third filter elements 86, 88 and 90 are disposed outside of the lubricant manifold 72, maintenance and visual inspection is greatly simplified. As appreciated, each of the first, second and third filter elements 86, 88 and 90 can be accessed by disconnecting the corresponding radial tubes 81, 83 and 85 from the lubricant manifold 72 without disassembling the lubricant manifold or removing it from the geared architecture 48 or static support structure.

Accordingly, maintenance of the example geared architecture 48 can include inspection of the filter elements 86, 88 and 90 to determine if contaminants are present within the lubrication system 62. Such maintenance includes accessing the connection point between the corresponding radial tubes 81, 83 and 85. Disconnecting the radial tube, removing the corresponding filter elements 86, 88 and 90 and visually inspecting the filter element for contaminants that may have been captured within that element.

Maintenance may further include removal of one of the filter elements 86, 88, and 90 and replacement with a filter element providing a different filtering characteristic, or flow characteristic.

Moreover, because each of the filter elements 86, 88 and 90 are different from each other, they provide a corresponding size and configuration to capture contaminants expected within each specific lubricant system. Moreover, the specific size and configuration of each of the filter elements 86, 88 and 90 are tailored to the requirements for oil supplied through that specific passage. In other words, contaminants with the journal bearing 126 may have a tolerance for contaminants of a specific size, whereas, the gears and carrier/torque frame assembly 130 can tolerate contaminants of another nature. Accordingly, each of the first, second and third filter elements 86, 88 and 90 are tailored to the tolerances of the specific features to which lubricant is supplied.

Moreover, the first, second and third lubricant flows 18A, 18B and 18C may be of different pressures, temperatures and flow rates that in turn determine the specific nature, porosity, size and material of the corresponding filter.

Accordingly, the example lubricant manifold system provides for the tailoring of contaminant prevention and lubricant flow to each specific element by providing different filter elements of different configurations for communicating lubricant to each of the features.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A fan drive gear system comprising;
a geared architecture including gears supported by bearing structures for providing a speed change between an input and output;
a lubricant manifold mounted to the geared architecture and defining a first lubricant passage and a second lubricant passage disposed within a common structure;
a first tube extending radially from the common structure and in fluid communication with the first lubricant passage;
a second tube extending radially from the common structure and in fluid communication with the second lubricant passage;
a first filter disposed within the first tube, the first filter including a first filtering characteristic for filtering lubricant flow to the first lubricant passage; and
a filter disposed within the second tube, the second filter including a second filtering characteristic for filtering lubricant flow to the second lubricant passage, wherein the second filtering characteristic is different than the first filtering characteristic.

2. The fan drive gear system as recited in claim 1, wherein the first filtering characteristic includes comprises a first porosity and the second filtering characteristic comprises a second porosity different than the first porosity.

3. The fan drive gear system as recited in claim 2, wherein the first filter and the second filter comprise mesh screens.

4. The fan drive gear system as recited in claim 2, wherein mesh screens comprise metal mesh screens with a plurality of openings.

5. The fan drive gear system as recited in claim 2, including a first screen disposed within the first lubricant passage of the lubricant manifold downstream of the first filter and a second screen disposed within the second lubricant passage downstream of the second filter.

6. The fan drive gear system as recited in claim 1, wherein the first filter provides a first resistance to lubricant flow and the second filter provides a second resistance to lubricant flow that is less than the first resistance.

7. The fan drive gear system as recited in claim 1, wherein at least one of the first and second filter elements is proximate a supply output end of the respective one of the first supply tube and the second supply tube.

8. The fan drive gear system as recited in claim 7, wherein at least one of the first and second tubes is detachably connected to the geared architecture at the supply output to provide for removing and replacing the at least one of the first and second filters.

9. The fan drive gear system as recited in claim 1, wherein the first tube and the second tube are removable from the common structure to enable removal and replacement of the corresponding one of the first filter and the second filter.

10. A lubrication system for gas turbine engine comprising:
a main lubricant passage including a main filter;
a lubricant manifold mounted to a static support structure of the gas turbine engine, the lubricant manifold in fluid communication with the main lubricant passage and including a first lubricant passage and a second lubricant passage disposed within a common structure,
a first tube extending radially from the common structure and in fluid communication with the first lubricant passage;
a second tube extending radially form the common structure and in fluid communication with the second lubricant passage;
a first filter element for filtering lubricant flow to the first lubricant passage, the first filter element disposed within the first tube; and
a second filter element for filtering lubricant flow to the second lubricant passage, the second filter element disposed within the second tube, wherein the second filter is different than the first filter element.

11. The lubrication system as recited in claim 10, wherein the first filter element is configured to provide lubricant flow at a first condition and the second filter element is configured to provide lubricant flow at a second condition different than the first condition.

12. The lubrication system as recited in claim 10, wherein the first filter comprises a first porosity and the second filter comprises a second porosity different than the first porosity.

13. The lubrication system as recited in claim 10, wherein the first filter provides a first resistance to lubricant flow and the second filter provides a second resistance to lubricant flow that is less than the first resistance.

14. The lubrication system as recited in claim 10, including a first screen disposed within the first lubricant passage of the lubricant manifold downstream of the first filter and a second screen disposed within the second lubricant passage downstream of the second filter.

15. The lubrication system for a gas turbine engine as recited in claim 10, wherein the first tube and the second tube are removable from the common structure to enable removal and replacement of the corresponding one of the first filter and the second filter.

\* \* \* \* \*